Sept. 27, 1932.  J. B. FREYSINGER  1,879,168
SAFETY SNAP HOOK
Filed July 10, 1931
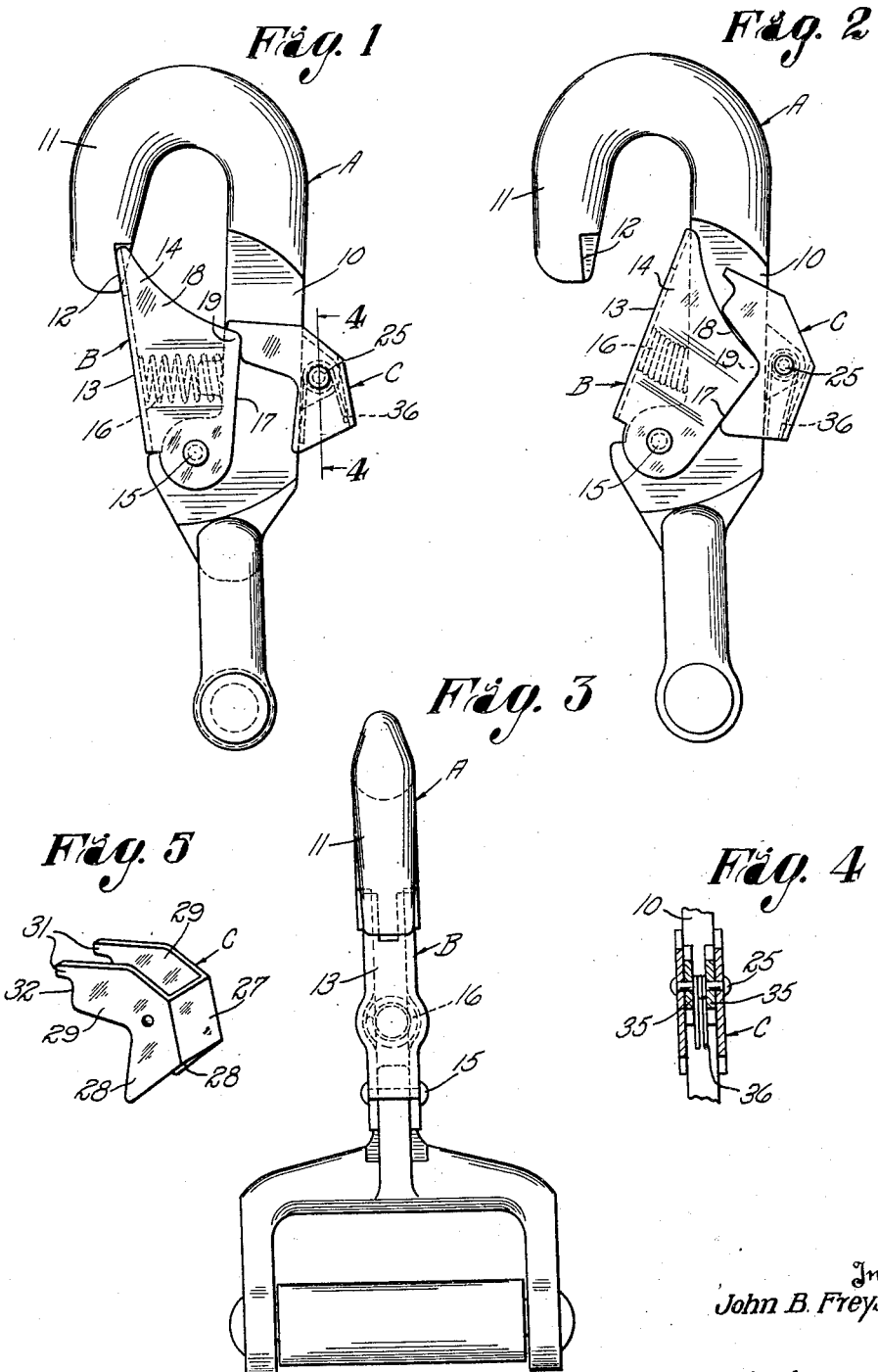

Patented Sept. 27, 1932

1,879,168

UNITED STATES PATENT OFFICE

JOHN B. FREYSINGER, OF NEW BRITAIN, CONNECTICUT, ASSIGNOR TO NORTH & JUDD MANUFACTURING COMPANY, OF NEW BRITAIN, CONNECTICUT, A CORPORATION OF CONNECTICUT

SAFETY SNAP HOOK

Application filed July 10, 1931. Serial No. 549,825.

This invention relates to snap hooks of the sort having a hook proper provided with a throat, a pivoted spring-pressed tongue for closing the throat, and means for locking the tongue against accidental opening movement. Snap hooks of this sort find general application, but they are particularly applicable for use in cases where the element of safety is of prime importance. For example, hooks constructed in accordance with the present invention may be used by linesmen, window washers, and similar workmen for securing themselves against accidental falls.

An aim of the invention is to provide a snap hook of this sort which is very effective in operation in that it automatically and securely locks the tongue in closed position.

A further aim of the invention is to provide a snap hook with improved locking means which may be very easily and readily manipulated.

A still further aim of the invention is to provide a safety snap hook having the above and other advantages and which is particularly characterized by its extreme simplicity in construction, its economy in manufacture, and its strength and durability.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown one embodiment which the present invention may take:

Fig. 1 is a side view of a snap hook showing the tongue locked in closed position by my improved latch;

Fig. 2 is a view similar to Fig. 1 but showing the tongue in open position;

Fig. 3 is a front view of the hook;

Fig. 4 is a sectional view through the latch, this view being taken substantially on line 4—4 of Fig. 1; and Fig. 5 is a perspective view of the latch lever.

Referring to the drawing in detail, I have shown therein the improvements of the present invention applied to a snap hook of an old and well known construction, it being understood that this disclosure is by way of illustration only. As therein disclosed, the hook proper A has a flat shank 10 provided at one end with a curved bill 11 having, at its free end and on its rear face, a seat 12 against which is adapted to engage the free end of a pivoted tongue B. This pivoted tongue, as is usual, may be formed of sheet metal bent to channel shape, it having a front wall 13 and a pair of side cheeks 14, the rear portions of which are in straddling relation to the shank 10. The tongue B is pivoted as at 15, and the upper or free end of the front wall thereof, when the hook is closed, is adapted to engage against the inwardly facing seat 12 of the bill. The tongue is normally urged forwardly into closed position by a coiled spring 16 which may be held in place in the usual manner. The rear edge 17 and the top or outer edge 18 of each cheek are at an angle to one another so as to form an angled corner or projection 19 with which is adapted to cooperate the locking device of the present invention, which will now be described.

This locking device is in the form of a lever C pivoted, as at 25, to the rear edge of the shank 10. The locking lever is preferably of channel form and is of such construction that it may be made of sheet metal by stamping and bending operations. In the present instance, the locking member has a rear wall 27 which constitutes a finger-piece and side walls 28 which straddle the shank 10. The forward ends of these walls 28 form a pair of spaced apart arms 29 disposed at an angle to the finger-piece 27 which constitutes the other end of the lever. Each arm has, at its forward end, a forwardly facing edge 32 and a forwardly extending projection 31. The pivot 25, which may be in the form of a pin or rivet, is substantially between the arms 29 and the finger-piece and is preferably carried by a pair of ears 35 extending rearwardly from the rear edge of the shank 10. The locking lever is normally urged to the locking position shown in Fig. 1 by a spring 36 coiled about the pivot 25 between the ears 35 and having its opposite ends respectively engaging the rear edge of the shank 10 and the front face of the thumb-piece or rear wall 27.

The operation of my improved snap hook will be readily understood from the foregoing description taken in connection with the following explanation. The spring 16 normally urges and holds the tongue in the closed position shown in Fig. 1, and the spring 36 maintains the locking lever in engagement with the tongue, as shown in that figure. When the parts are in this position, the corners 19 of the cheeks of the tongue are received by and engage in the notches of the locking lever. The projections 31 of this locking lever engage the outer edges 18 of the cheeks so as to limit the extent of pivotal movement of the locking lever, while the forwardly facing edges 32 of the locking lever engage behind the rear edges 17 of the tongue, thus positively locking this tongue against inward movement. When it is desired to engage the hook with a ring or other element, the safety hook is grasped so that one digit of the hand, say the thumb, will engage the front wall of the tongue and another digit of the hand, say the index finger, will engage the thumb-piece 27 of the latching lever. Then, by moving these digits towards each other, pressure is applied both to the tongue and the locking lever so that the locking lever is swung upwardly and rearwardly and the tongue is moved inwardly, as indicated by Fig. 2. Both of these members are turned in the same direction, when opening the tongue. The bill may then be hooked over the eye or the like, and the tongue and locking lever released. Thereupon, the tongue will automatically move to closed position under the influence of the spring 16, and the locking lever will move to the locking position shown in Fig. 1 under the influence of the spring 36. There is now no possibility of the hook becoming inadvertently disengaged from the eye or other member with which it is associated because the locking lever, since it engages behind the tongue, will prevent that tongue from being opened accidentally should it be pushed or struck against an object. The hook can be disengaged only by applying pressure simultaneously both to the tongue and the locking lever. It is clear that the safety hook may be very easily and conveniently manipulated to engage and disengage it, and accidental disengagement of the hook is entirely guarded against. It is further obvious that my improved arrangement is very simple in construction and may be incorporated in a safety hook at little additional cost. The ears 35 may be cast integral with the hook proper, and the locking lever may be very cheaply made as all that is necessary is to stamp out a blank from sheet metal and bend the blank to the desired shape. The additional cost of the spring 36 is practically negligible.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. In a safety snap hook, a hook proper having a shank provided with a bill at one end, said bill having at its free end a rearwardly facing seat, a tongue pivoted for swinging opening movement towards said shank and adapted to engage against said seat when the hook is closed, and means pivoted to said hook for engaging said tongue to lock the latter in closed position and for turning in the same direction as said tongue upon an opening movement of said tongue and said means.

2. In a safety snap hook, a hook proper having a shank with a curved bill, a tongue pivoted to said shank and adapted to engage said bill, said tongue having a pair of side cheeks straddling said shank and one of said cheeks having a shoulder at its rear edge, and a locking lever pivoted to said shank and having an arm in the plane of one of said cheeks, said arm having a shoulder adapted to engage behind said first shoulder to hold the tongue in closed position.

3. In a safety snap hook, a hook proper having a shank and a curved bill at one end thereof, a tongue pivoted to said shank and adapted to engage said bill, said tongue having a pair of cheeks straddling said shank, a locking lever pivoted to said shank and having an arm along one side of said shank and in the plane of one of said cheeks, said arm having a projection adapted to rest upon the outer edge of said cheek and said arm having a shoulder adapted to engage behind the rear edge of said cheek, and a spring normally urging said lever into locking position.

4. In a safety snap hook, a hook proper provided with a shank and a curved bill, a tongue pivoted to said shank and adapted to engage said bill and having a pair of cheeks straddling said shank, a locking lever pivoted to the rear edge of said shank and having a pair of forwardly extending arms straddling said shank and adapted to engage behind said cheeks when the locking lever is in locking position, said locking lever also having a finger piece, and a spring normally urging said locking lever into locking position.

5. In a safety snap hook, a hook proper having a shank and a curved bill, a tongue pivoted to said shank and adapted to engage said bill and having a pair of side cheeks straddling said shank, a locking lever having a thumb piece and a pair of forwardly extending arms straddling said shank, means between said arms and thumb piece for pivotally connecting said locking lever to said shank, and a spring normally urging said locking lever into locking position, the forward ends of said arms being adapted to engage behind said cheeks, one of said arms having a projection adapted to rest upon the associated cheek for limiting the movement of said locking lever in one direction.

6. In a safety snap hook, a hook proper having a shank provided with a bill at one end, said bill having at its free end a rearwardly facing seat and said shank having at its rear edge a pair of ears, a tongue pivoted for swinging opening movement towards said shank and adapted to engage said seat when the hook is closed, said tongue having a pair of cheeks straddling said shank and each cheek having an outer edge and a rear edge forming a corner, a locking lever pivoted to said ears and having a rear wall to one side of the pivot and constituting a thumb piece, said locking lever having a pair of side walls the forward ends of which constitute a pair of spaced apart arms in straddling relation to said shank, each of said arms having at its forward end a forwardly facing shoulder and a forwardly extending projection above the shoulder, said projections being adapted to engage upon the outer edges of said cheeks and said forwardly facing shoulders being adapted to engage behind the rear edges of the cheeks, and a spring normally urging said lever into locking position.

7. In a safety snap hook, a hook proper having a throat, a tongue pivoted to said hook and adapted to close said throat, and means pivoted to said hook for engaging said tongue to lock the latter in closed position and for turning simultaneously in the same direction as said tongue upon an opening movement of said tongue and said means.

JOHN B. FREYSINGER.